(12) United States Patent
Fischer et al.

(10) Patent No.: US 8,481,630 B2
(45) Date of Patent: Jul. 9, 2013

(54) PROCESS FOR THE PRODUCTION OF MOLDINGS WITH REDUCED FORMATION OF DEPOSIT

(75) Inventors: Wolfgang Fischer, Meerbusch (DE); Moritz Ehrenstein, Ludwigshafen (DE)

(73) Assignee: Styrolution GmbH (DE)

( * ) Notice: Subject to any disclaimer, the term of this patent is extended or adjusted under 35 U.S.C. 154(b) by 441 days.

(21) Appl. No.: 12/743,884

(22) PCT Filed: Dec. 2, 2008

(86) PCT No.: PCT/EP2008/066622
§ 371 (c)(1),
(2), (4) Date: May 20, 2010

(87) PCT Pub. No.: WO2009/071537
PCT Pub. Date: Jun. 11, 2009

(65) Prior Publication Data
US 2010/0292385 A1 Nov. 18, 2010

(30) Foreign Application Priority Data
Dec. 4, 2007 (EP) .................................... 07122265

(51) Int. Cl.
*C08K 3/08* (2006.01)
*B29C 45/00* (2006.01)

(52) U.S. Cl.
USPC ........................................ 524/439; 264/328.1

(58) Field of Classification Search
USPC ....................................................... 524/439
See application file for complete search history.

(56) References Cited

U.S. PATENT DOCUMENTS

| | | | |
|---|---|---|---|
| 3,530,094 A | 9/1970 | Schnell et al. | |
| 3,535,280 A | 10/1970 | Schnell et al. | |
| 3,737,409 A | 6/1973 | Fox | |
| 5,527,602 A | 6/1996 | Eisen et al. | |
| 6,187,825 B1 | 2/2001 | Guntherberg et al. | |
| 6,482,444 B1 * | 11/2002 | Bellantone et al. | 424/618 |
| 2002/0190425 A1 | 12/2002 | Ittermann et al. | |
| 2004/0102564 A1 | 5/2004 | Guntherberg et al. | |
| 2006/0258805 A1 | 11/2006 | Breulmann et al. | |

FOREIGN PATENT DOCUMENTS

| | | |
|---|---|---|
| DE | 1495730 | 4/1969 |
| DE | 1300266 | 7/1969 |
| DE | 4408213 | 9/1995 |
| DE | 4408213 A1 * | 9/1995 |
| DE | 10321081 | 12/2004 |
| EP | 630938 | 12/1994 |
| EP | 630938 A1 * | 12/1994 |
| EP | 0567883 | 5/1995 |
| WO | WO-98/28344 | 7/1998 |
| WO | WO-00/15718 | 3/2000 |
| WO | WO-00/26274 | 5/2000 |
| WO | WO-00/61664 | 10/2000 |
| WO | WO-01/48070 | 7/2001 |
| WO | WO-0242347 | 5/2002 |

OTHER PUBLICATIONS

Translation of DE4408213, Sep. 14, 1995.*
English language translation of the International Preliminary Report on Patentability mailed in International Application No. PCT/EP2008/066622 on Sep. 21, 2010.

* cited by examiner

*Primary Examiner* — Hui Chin
(74) *Attorney, Agent, or Firm* — Novak Druce Connolly Bove + Quigg LLP

(57) ABSTRACT

The invention relates to processes for the production of moldings via shaping of thermoplastic molding compositions F with reduced formation of deposit on the shaping mold, and it is essential to the invention that the thermoplastic molding compositions F comprise an amount of from 0 mg/kg to 100 mg/kg (calculated as the total of the mg of Mg and the mg of Ca per kg of thermoplastic molding composition F and determined by means of atomic emission spectrometry using inductively coupled plasma (ICPAES)) of magnesium compounds and/or calcium compounds; the invention further relates to the use of molding compositions F in the inventive processes, and also to moldings which can be produced by the inventive processes.

14 Claims, No Drawings

PROCESS FOR THE PRODUCTION OF MOLDINGS WITH REDUCED FORMATION OF DEPOSIT

CROSS REFERENCE TO RELATED APPLICATIONS

This application is a national stage application under 35 U.S.C. §371 of PCT/EP2008/066622, filed Dec. 2, 2008, which claims benefit to European application 07122265.7, filed Dec. 4, 2007, the entire disclosures of which are hereby incorporated by reference.

The invention relates to processes for the production of moldings via shaping of thermoplastic molding compositions F with reduced formation of deposit on the shaping mold.

The present invention further relates to the use of molding compositions F in the inventive processes, and also to moldings which can be produced by the inventive processes.

The prior art describes a very wide variety of thermoplastic molding compositions, and also processes for the production of moldings via shaping of these thermoplastic molding compositions. These shaping processes melt plastics and extrude them through dies, for example into molds or onto conveyor belts. A frequently encountered problem with these shaping processes is the formation of mold deposits on the shaping molds, which occurs preferentially here near to the gate or in the region of vents, and/or on the surfaces of the moldings. The deposits are composed of materials precipitated from the plastic. They can derive by way of example from contaminants or auxiliaries coming from the production process, or from additives conventional in plastics, examples being flame retardants, lubricants, or pigments. These mold deposits can lead to impaired surface quality of the moldings, to problems in printing or adhesive-bonding, and to poor replication of cavities.

WO 98/28344 discloses by way of example processes for the production of thermoplastic molding compositions in which graft rubber dispersions are not coagulated via addition of acids or salts as coagulants, but instead via a specific mechanical shear-precipitation process. This leads to substantial avoidance of contaminants in the thermoplastic molding compositions which can lead to impairment of product properties. The contents of any salts, acids, or contaminants are not disclosed. Nor are any statements made concerning production of moldings from these thermoplastic molding compositions.

DE 44 08 213 A1 describes ABS molding compositions comprising from 0.001 to 0.3% by weight of specific salts, and these also include certain magnesium compounds and calcium compounds. The processing of these ABS molding compositions at relatively high temperature to give molding is intended to be possible with reduced discoloration and thus with improved intrinsic color of the polymers. There is no discussion of other possible difficulties in production of the moldings, in particular any reduction in formation of mold deposit.

The invention disclosed in WO 02/42347 is based on the object of inhibiting mold deposits during production of moldings. According to that specification, the achievement of this object consists in the addition of a pH buffer system after polymerization of the elastomeric polymer has been completed. There is no disclosure of the quantitative proportions of any magnesium compounds or calcium compounds in the resultant thermoplastic molding compositions.

The invention disclosed in WO 01/48070 is also based on the object of minimizing or inhibiting mold deposits during production of moldings. The achievement of this object consists, according to that specification, in the addition of from 0.02 to 10% by weight of a magnesium oxide (corresponding to from 120 to 60 000 mg/kg of Mg) whose citric acid value is <1500 sec, as additive during production of the moldings.

According to the teaching of EP 630 938 A1, during injection molding to give moldings, flame-retardant thermoplastic molding compositions have a uniform surface without discoloration, exudation or evolution of gas, if the flame retardant used has a magnesium content of 50 mg/kg or less. The specification does not anywhere reveal that the magnesium content of the entire thermoplastic molding composition could have a significance with regard to the achievement of the underlying object.

It was an object of the present invention to provide processes for the production of moldings via shaping of thermoplastic molding compositions, where these exhibit reduced formation of deposit on the shaping mold and/or on the surface of the moldings when comparison is made with the known processes.

Accordingly, the processes defined in the introduction have been found, and it is essential to the invention that the thermoplastic molding compositions F comprise an amount of from 0 mg/kg to 100 mg/kg (calculated as the total of the mg of Mg and the mg of Ca per kg of thermoplastic molding composition F and determined by means of atomic emission spectrometry using inductively coupled plasma (ICPAES)) of magnesium compounds and/or calcium compounds.

When compared with the known processes, the inventive processes for the production of moldings via shaping of thermoplastic molding compositions F exhibit reduced formation of deposits on the shaping mold and/or on the surface of the moldings.

The inventive processes, and also the inventive uses and other subject matters are described below.

It is essential to the invention that the production of the molding via shaping uses, as starting material, thermoplastic molding compositions F which comprise an amount of from 0 mg/kg to 100 mg/kg (calculated as the total of the mg of Mg and the mg of Ca per kg of thermoplastic molding composition F) of magnesium compounds and/or calcium compounds. It is preferable that the thermoplastic molding compositions F that can be used in the inventive processes comprise an amount of from 0.1 mg/kg to 100 mg/kg, particularly preferably from 3 mg/kg to 75 mg/kg, in particular from 5 mg/kg to 50 mg/kg (in each case calculated as the total of the mg of Mg and the mg of Ca per kg of thermoplastic molding composition F) of at least one magnesium compound and/or calcium compound.

The magnesium contents and calcium contents of the thermoplastic molding compositions can be determined by means of atomic emission spectrometry using inductively coupled plasma (ICPAES)); this method is known to the person skilled in the art and is described in the literature.

Magnesium compounds and/or calcium compounds that can be used with preference are magnesium oxide, magnesium hydroxide, magnesium sulfate, magnesium carbonate, magnesium stearate, calcium hydroxide, calcium carbonate, calcium sulfate, calcium stearate, or a mixture composed of two or more of the compounds mentioned. Magnesium sulfate and magnesium stearate are particularly preferred.

The thermoplastic molding compositions F can, in principle, comprise, as plastics component, any of the thermoplastic polymers known to the person skilled in the art and described in the literature; mixtures composed of a plurality of these thermoplastic polymers are also suitable.

Examples of suitable thermoplastic polymers are:
polyolefins, such as polyethylene and propylene, polyvinyl chloride,
styrene polymers, such as polystyrene (impact-resistant or not impact-modified),
impact-modified vinylaromatic copolymers, such as ABS (acrylonitrile-butadiene-styrene), ASA (acrylonitrile-styrene-acrylate), and MABS (transparent ABS, comprising methacrylate units),
styrene-butadiene block copolymers ("SBC"), in particular thermoplastic elastomers based on styrene ("STPE"),
polyamides,
polyesters, such as polyethylene terephthalate (PET), polyethylene terephthalate glycol (PETG), and polybutylene terephthalate (PBT),
polycarbonate (e.g. Makrolono® from Bayer AG),
polymethyl methacrylate (PMMA),
poly(ether) sulfones, and
polyphenylene oxide (PPO).

Thermoplastic polymers that can be used with preference as plastics component of the thermoplastic molding compositions F are one or more polymers selected from the group of ASA, ABS, polyamides, and polyesters.

Preferred impact-modified vinylaromatic copolymers are impact-modified copolymers composed of vinylaromatic monomers and of vinyl cyanides (SAN). Preferred impact-modified SAN used comprises ASA polymers and/or ABS polymers, and also (meth)acrylate-acrylonitrile-butadiene-styrene polymers ("MABS", transparent ABS), and also blends of SAN, ABS, ASA, and MABS with other thermoplastics, such as polycarbonate, polyamide, polyethylene terephthalate, polybutylene terephthalate, PVC, and polyolefins.

ASA polymers are generally impact-modified SAN polymers in which elastomeric graft copolymers of vinylaromatic compounds, in particular styrene, and of vinyl cyanides, in particular acrylonitrile, are present on polyalkyl acrylate rubbers in a copolymer matrix composed in particular of styrene and/or α-methylstyrene and acrylonitrile. ASA polymers are known to the person skilled in the art and are described in the literature, for example in DIN EN ISO 6402-1 DE of February 2003.

ABS polymers are generally impact-modified SAN polymers in which diene polymers, in particular 1,3-polybutadiene, are present in a copolymer matrix composed in particular of styrene and/or α-methylstyrene and acrylonitrile. ABS polymers are known to the person skilled in the art and are described in the literature, for example in DIN EN ISO 2580-1 DE of February 2003.

Other thermoplastic polymers that can be used with preference as plastics component of the thermoplastic molding compositions F are semicrystalline polyolefins, such as homo- or copolymers of ethylene, propylene, 1-butene, 1-pentene, 1-hexene, 4-methyl-1-pentene, and also ethylene copolymers with vinyl acetate, vinyl alcohol, ethyl acrylate, butyl acrylate, or methacrylate. It is preferable to use a high-density polyethylene (HDPE), low-density polyethylene (LDPE), linear-low-density polyethylene (LLDPE), polypropylene (PP), ethylene-vinyl acetate copolymer (EVA), or ethylene-acrylic copolymer. Propylene is particularly preferred.

Thermoplastic polymers that can be used with equal preference as plastics component of the thermoplastic molding compositions F are polycarbonates. The molar mass of the polycarbonates (weight average $M_w$, determined by means of gel permeation chromatography in tetrahydrofuran against polystyrene standards) is preferably in the range from 10 000 to 60 000 g/mol. They can be obtained by way of example by the processes of DE-B-1 300 266 via interfacial polycondensation, or according to the process of DE-A-1 495 730 via reaction of diphenyl carbonate with bisphenols. Preferred bisphenol is 2,2-di(4-hydroxyphenyl)propane, generally—and also hereinafter—termed bisphenol A.

Instead of bisphenol A, it is also possible to use other aromatic dihydroxy compounds, in particular 2,2-di(4-hydroxyphenyl)pentane, 2,6-dihydroxynaphthalene, 4,4'-dihydroxydiphenyl sulfane, 4,4'-dihydroxydiphenyl ether, 4,4'-dihydroxydiphenyl sulfite, 4,4'-dihydroxydiphenylmethane, 1,1-di(4-hydroxyphenyl)ethane, 4,4-dihydroxy-biphenyl, or dihydroxydiphenylcycloalkanes, preferably dihydroxydiphenylcyclohexanes or dihydroxylcyclopentanes, in particular 1,1-bis(4-hydroxyphenyl)-3,3,5-trimethyl-cyclohexane, or else a mixture of the abovementioned dihydroxy compounds. Particularly preferred polycarbonates are those based on bisphenol A or bisphenol A together with up to 80 mol % of the abovementioned aromatic dihydroxy compounds. Polycarbonates having particularly good suitability are those comprising units which derive from resorcinol esters or from alkyl resorcinol esters, these being described by way of example in WO 00/61664, WO 00/15718 or WO 00/26274; these polycarbonates are marketed by way of example by General Electric Company with trademark SoIIX®.

It is also possible to use polycarbonates according to U.S. Pat. No. 3,737,409; compounds of particular interest are copolycarbonates based on bisphenol A and di(3,5-dimethyl-dihydroxyphenyl) sulfone, which feature high heat resistance. It is also possible to use mixtures of various polycarbonates.

A particularly suitable thermoplastic polymer in the thermoplastic molding compositions F is any of the aromatic or aliphatic thermoplastic polyurethanes, and amorphous aliphatic thermoplastic polyurethanes which are transparent are particularly suitable. Aliphatic thermoplastic polyurethanes and their preparation are known to the person skilled in the art, for example from EP-B1 567 883 or DE-A 10321081, and are commercially available, for example with trademarks Texin® and Desmopan® from Bayer Aktiengesellschaft.

The thermoplastic molding compositions F can comprise any of the additives which are described in the literature and are conventional in plastics and are known to the person skilled in the art. It is preferable that these additives conventional in plastics comprise in essence no magnesium compounds and/or no calcium compounds. The expression "in essence" means that the content of magnesium compounds and/or calcium compounds in the additives conventional in plastics is below the detection limit of the ICPAES analysis method.

For the purposes of the present invention, examples of additives conventional in plastics are stabilizers and oxidation retarders, agents to counteract decomposition by heat and decomposition by ultraviolet light, lubricants and mold-release agents, dyes and pigments, and plasticizers, and also fibers, such as glass fibers or carbon fibers.

Examples of oxidation retarders and heat stabilizers which can be added to the thermoplastic molding composition F according to the invention are halides of metals of group I of the Periodic Table of the Elements, e.g. sodium halides, potassium halides, and lithium halides. Zinc fluoride and zinc chloride can also be used. Other compounds that can be used are sterically hindered phenols, hydroquinones, substituted representatives of this group, secondary aromatic amines, if appropriate in conjunction with phosphorus-containing acids or, respectively, salts of these, and mixtures of said compounds, preferably in concentrations of up to 1% by weight, based on the weight of the thermoplastic molding compositions F.

Examples of UV stabilizers are various substituted resorcinols, salicylates, benzotriazoles, and benzophenones, the amounts of which generally used are up to 2% by weight, based on the weight of the thermoplastic molding compositions F.

Lubricants and mold-release agents, the amounts of which that can be added are generally up to 1% by weight, based on the weight of the thermoplastic molding compositions F, are stearic acid, stearyl alcohol, alkyl stearates, and stearamides, and also esters of pentaerythritol with long-chain fatty acids. Stearic acid salts of zinc or of aluminum can also be used, as also can dialkyl ketones, e.g. distearyl ketone. Particularly suitable compounds according to the invention are stearates, and also N, N'-ethylenebisstearamide.

Glass fibers that can be used in the inventive molding compositions F are any of the glass fibers described in the literature and known to the person skilled in the art (see by way of example Milewski, J. V., Katz, H. S. "Handbook of Reinforcements for Plastics", p. 233 ff., Van Nostrand Reinholt Company Inc, 1987).

Thermoplastic molding compositions F that can be used with particular preference in the inventive processes comprise, alongside the at least one magnesium compound and/or calcium compound, A) from 20 to 100% by weight, preferably from 30 to 100% by weight, particularly preferably from 40 to 100% by weight, of at least one impact-modified vinylaromatic copolymer selected from the group of acrylonitrile-butadiene-styrene copolymers (ABS), acrylonitrile-styrene-acrylate-copolymers (ASA), and methacrylate-acrylonitrile-butadiene-styrene copolymers (MABS),
B) from 0 to 80% by weight, preferably from 0 to 70% by weight, particularly preferably from 0 to 60% by weight, of at least one polycarbonate (PC), and
C) from 0 to 60% by weight, preferably from 0 to 45% by weight, particularly preferably from 0 to 25% by weight, of other additives conventional in plastics, where each of the percentages by weight is based on the total weight of components A) to C) and the total of the percentages is 100% by weight.

The thermoplastic molding compositions F can be prepared by processes described in the literature and known to the person skilled in the art, in particular via mixing in the melt of the thermoplastic polymers, of the magnesium compound and/or calcium compound, and, if appropriate, of the additives conventional in plastics, in a screw extruder.

Screw extruders that can be used are single-screw extruders or twin-screw extruders which have corotating and intermeshing action or else have counterrotating intermeshing or non-intermeshing action. Preference is given to use of twin-screw extruders. Particular preference is given to corotating, intermeshing twin-screw extruders. Suitable screw extruders are described by way of example in Saechtling, Kunststoff-Taschenbuch [Plastics Handbook], Hanser Verlag, Munich, Vienna, edition 26, 1995, pages 191 to 246.

In the inventive processes for the production of moldings via shaping of thermoplastic molding compositions F, the shaping preferably takes place via extrusion, in particular extrusion to give pellets, foils, sheets, strands, or profiles, or via injection molding to give moldings; particular preference is given to injection molding to give moldings. The processes mentioned of extrusion and of injection molding, and also the apparatuses used in these, are known per se to the person skilled in the art and are described in the literature.

Use of the thermoplastic molding compositions F comprising the abovementioned amount of magnesium compounds and/or calcium compounds in the inventive processes achieves reduced formation of deposit on the shaping mold when comparison is made with the known processes.

Examples of particularly preferred moldings which can be produced by the inventive processes are household items, electronic components, medical equipment, motor vehicle components, and construction materials, in particular injection-molded chip cards and play bricks, housings for electrical and electronic parts, examples being kitchen machines, shavers, telephones, vacuum cleaners, monitor cases, keyboards, electric lawnmowers, model railroads, washing machines, dishwashers, refrigerators, parts for the interior of motor vehicles and for exterior use on motor vehicles, e.g. wheel caps, exterior mirrors (colored, painted, or electroplated), radiator grilles, and spoilers.

The moldings that can be produced by the inventive processes have improved surface quality by virtue of the reduced formation of deposit during shaping when comparison is made with moldings that can be produced by known processes.

The invention is explained in more detail below, using examples.

EXAMPLES

Examples with prefix "comp-" are non-inventive and serve for comparison.
Feedstocks, Molding Compositions F, and Comparative Molding Compositions Comp. F, and their Preparation:
Molding compositions with prefix "comp-" are non-inventive serve for comparison.
Preparation of Graft Rubbers:
Preparation of a Butadiene Graft Rubber A:

60 parts by weight of butadiene were polymerized at 65° C. as far as 98% by weight monomer conversion, in a solution of 0.6 part by weight of tert-dodecyl mercaptan, 0.7 part by weight of potassium stearate as emulsifier, 0.2 part by weight of potassium peroxodisulfate, and 0.2 part by weight of sodium hydrogencarbonate, in 80 parts by weight of water. The resultant latex was agglomerated via addition of 2.5 parts by weight of a 10% strength by weight emulsion of a copolymer composed of 96% by weight of ethyl acrylate and 4% by weight of methacrylamide.

40 parts by weight of water, 0.4 part by weight of potassium stearate, and 0.2 part by weight of potassium peroxodisulfate were added to the resultant dispersion. 40 parts by weight of a mixture composed of 70% by weight of styrene and 30% by weight acrylonitrile were then added within a period of 4 hours, and the mixture was kept at 70° C., with stirring. Once the graft copolymerization reaction had ended, the butadiene graft rubber was precipitated from the dispersion at 89° C. by means of magnesium sulfate solution and dried in a current of warm air.
Preparation of a Butadiene Graft Rubber B:

The butadiene graft rubber B was prepared as described for the preparation of the butadiene graft rubber A as far as completion of the graft copolymerization reaction. However, the subsequent precipitation of the butadiene graft rubber B from the dispersion did not take place by means of magnesium sulfate solution but instead via freeze precipitation in a flake-ice machine, followed by 30 minutes of sintering at 121° C. and then cooling to 60° C. Water was then removed by centrifuging. The resultant dewatered butadiene graft rubber. (residual moisture content about 30% by weight) was then dried in a current of warm air.
Preparation of an Acrylate Graft Rubber H:

17.5 parts by weight of butyl acrylate and 0.1 part by weight of allyl methacrylate were heated to 60° C., with stirring, in 150 parts by weight of water, with addition of 0.2 part by weight of potassium stearate, 0.3 part by weight of potassium persulfate, 0.3 part by weight of sodium hydrogencarbonate, and 0.15 part by weight of sodium pyrophosphate. 10 minutes after the beginning of the polymerization reaction, a mixture composed of 82 parts by weight of butyl acrylate and 0.4 part by weight of allyl methacrylate was added within a period of 3 hours. Once monomer addition had been completed, polymerization was continued for a further hour.

The following were metered simultaneously and separately over the course of 3 hours at 60° C. into an initial charge composed of 2.5 parts by weight of the resultant rubber latex, after addition of 50 parts by weight of water and 0.1 part by weight of potassium peroxodisulfate: a mixture composed of 49 parts by weight of butyl acrylate and 0.25 part by weight of allyl methacrylate, and a solution of 0.5 part by weight of potassium stearate in 25 parts by weight of water. When metering had ended, polymerization was continued for 2 hours.

150 parts by weight of the resultant rubber latex were mixed with 20 parts by weight of styrene and 60 parts by weight of water and heated to 65° C. for 3 hours, with stirring, after addition of a further 0.03 part by weight of potassium peroxodisulfate and 0.05 part by weight of lauroyl peroxide. This graft copolymer dispersion was polymerized for a further 3 hours with 20 parts by weight of a mixture composed of styrene and acrylonitrile (ratio by weight 75:25) without any further additives. Once the graft copolymerization reaction had been completed, the acrylate graft rubber was precipitated at 91° C. from the dispersion by means of magnesium sulfate solution, and dried in a current of warm air.

Preparation of an Acrylate Graft Rubber I:

The acrylate graft rubber I was prepared as described for the preparation of the acrylate graft rubber H as far as completion of the graft copolymerization reaction. However, the subsequent precipitation of the acrylate graft rubber I from the dispersion did not take place by means of magnesium sulfate solution but instead via freeze precipitation in a flake-ice machine, followed by 30 minutes of sintering at 121° C. and then cooling to 60° C. Water was then removed by centrifuging. The resultant dewatered acrylate graft rubber (residual moisture content about 30% by weight) was then dried in a current of warm air.

Preparation of Molding Compositions F and Comparative Molding Compositions Comp C-F:

Preparation of Comparative Molding Composition Comp-F-C (ABS):

48 parts by weight of the dried butadiene graft rubber A were extruded and pelletized at 250° C. in a ZSK 30 twin-screw extruder with 52 parts by weight of pellets of a commercially available styrene-acrylonitrile copolymer whose acrylonitrile content was 24% by weight and whose viscosity number was 64. The magnesium content in the pellets was 510 mg/kg, and the calcium content in the pellets was <3 mg/kg.

Preparation of Molding Composition F-D (ABS):

48 parts by weight of the dried butadiene graft rubber B were extruded and pelletized at 250° C. in a ZSK 30 twin-screw extruder with 52 parts by weight of pellets of a commercially available styrene-acrylonitrile copolymer whose acrylonitrile content was 24% by weight and whose viscosity number was 64. The magnesium content in the pellets was <3 mg/kg, and the calcium content in the pellets was <3 mg/kg.

Preparation of Molding Composition F-E (ABS):

20 parts by weight of the dried butadiene graft rubber B were extruded and pelletized at 250° C. in a ZSK 30 twin-screw extruder with 20 parts by weight of pellets of a commercially available styrene-acrylonitrile copolymer whose acrylonitrile content was 24% by weight and whose viscosity number was 64, and with 60 parts by weight of an α-methyl-styrene-acrylonitrile copolymer whose acrylonitrile content was 30% by weight and whose viscosity number was 57. The magnesium content in the pellets was <3 mg/kg, and the calcium content in the pellets was <3 mg/kg.

Preparation of Comparative Molding Composition Comp-F-J (ASA):

45 parts by weight of the dried acrylate graft rubber H were extruded and pelletized at 250° C. in a ZSK 30 twin-screw extruder with 50 parts by weight of pellets of a commercially available styrene-acrylonitrile copolymer whose acrylonitrile content was 19% by weight and whose viscosity number was 100. The magnesium content in the pellets was 370 mg/kg, and the calcium content in the pellets was <3 mg/kg.

Preparation of Molding Composition F-K (ASA):

The preparation of molding composition F-K took place as for that of the comparative molding composition comp-F-J, but, instead of the acrylate graft rubber H, the acrylate graft rubber I was used. The magnesium content in the pellets was <3 mg/kg, and the calcium content in the pellets was <3 mg/kg.

Preparation of Comparative Molding Composition Comp-F-L (ASA):

45 parts by weight of the dried acrylate graft rubber H were extruded and pelletized at 250° C. in a ZSK 30 twin-screw extruder with 55 parts by weight of pellets of a commercially available styrene-acrylonitrile copolymer whose acrylonitrile content was 35% by weight and whose viscosity number was 80. The magnesium content in the pellets was 360 mg/kg, and the calcium content in the pellets was <3 mg/kg.

Preparation of Molding Composition F-M (ASA):

The preparation of molding composition F-M took place as for that of the comparative molding composition comp-F-L, but instead of the acrylate graft rubber H, the acrylate graft rubber I was used. The magnesium content in the pellets was <3 mg/kg, and the calcium content in the pellets was <3 mg/kg.

Preparation of Comparative Molding Composition Comp-F-N (ASA/PC Blend):

20 parts by weight of the dried acrylate graft rubber H were extruded and pelletized at 250° C. in a ZSK 30 twin-screw extruder with 20 parts by weight of pellets of a commercially available styrene-acrylonitrile copolymer whose acrylonitrile content was 35% by weight and whose viscosity number was 80, and with 60 parts by weight of pellets of a commercially available polycarbonate, Makrolon® 2800 from Bayer Material Science AG. The magnesium content in the pellets was 135 mg/kg, and the calcium content in the pellets was <3 mg/kg.

Preparation of Molding Composition F-P (ASA/PC Blend):

8.5 parts by weight of the dried acrylate graft rubber H were extruded and pelletized at 250° C. in a ZSK 30 twin-screw extruder with 8.5 parts by weight of the dried acrylate graft rubber I, 13 parts by weight of pellets of a commercially available styrene-acrylonitrile copolymer whose acrylonitrile content was 19% by weight and whose viscosity number was 70, and with 60 parts by weight of pellets of a commercially available polycarbonate, Makrolon® 2800 from Bayer Material Science AG. The magnesium content in the pellets was 36 mg/kg, and the calcium content in the pellets was <3 mg/kg.

Preparation of Molding Composition F-P (ASA/PC Blend):

30 parts by weight of the dried acrylate graft rubber I were extruded and pelletized at 250° C. in a ZSK 30 twin-screw extruder with 10 parts by weight of pellets of a commercially available styrene-acrylonitrile copolymer whose acrylonitrile content was 19% by weight and whose viscosity number was 70, and with 60 parts by weight of pellets of a commercially available polycarbonate, Makrolon® 2800 from Bayer Material Science AG. The magnesium content in the pellets was <3 mg/kg, and the calcium content in the pellets was <3 mg/kg.

Preparation of Comparative Molding Composition Comp-F-Q (MABS):

Pellets of a commercially available PMMA/ABS blend, Terlux® BX 13010 from BASF SE, were used. The magnesium content in the pellets was 212 mg/kg, and the calcium content in the pellet was less <3 mg/kg.

Tests Methods:

Determination of Magnesium Contents and Calcium Contents:

The magnesium contents and calcium contents of the abovementioned molding compositions F and of the comparative molding compositions comp-F were determined by igniting a respective weighed amount of the relevant plastics pellets, subjecting the ignition residual to soda-borax digestion, and then dissolving the digestion residual in hydrochloric acid and determining the Mg content and Ca content of the hydrochloric acid solution by means of atomic emission spectroscopy using inductively coupled plasma (ICPAES).

Production of Moldings and Formation of Deposit

To determine the extent of formation of deposit during production of the moldings, the abovementioned molding compositions F and comparative molding compositions comp-F in the form of pellets were metered under identical conditions into an injection molding machine, and melted, and injection-molded in a mold for producing tensile specimens with a weld line and having no vents. Injection of the tensile specimen in this mold took place from the two ends, the result being that the two melt fronts met in the center of the mold and produced a weld line. After every 500 shots, i.e. injection-molded test specimens, the mold was dismantled and the mold deposits occurring in the vicinity of the weld line were assessed visually and graded on a scale from 1 (very good, no mold deposits) to 6 (unsatisfactory, high level of mold deposits). Table 1 gives the respective grades.

| Example | Molding composition | Ca content of molding composition [mg/kg] | Mg content of molding composition [mg/kg] | Grade for mold deposit formation |
|---|---|---|---|---|
| comp-1 | comp-F-C | <3 | 510 | 5 |
| 2 | F-D | <3 | <3 | 2 |
| 3 | F-E | <3 | <3 | 2 |
| comp-4 | comp-F-J | <3 | 370 | 4-5 |
| 5 | F-K | <3 | <3 | 2 |
| comp-6 | comp-F-L | <3 | 360 | 4-5 |
| 7 | F-M | <3 | <3 | 2 |
| comp-8 | comp-F-N | 11 | 135 | 3 |
| 9 | F-O | 5 | 36 | 2-3 |
| 10 | F-P | 8 | <3 | 2 |
| comp-11 | comp-F-Q | <3 | 212 | 4 |

*Examples and molding compositions with prefix "comp-" are non-inventive and serve for comparison.

The examples confirm that, when compared with the known processes, the inventive processes for the production of moldings via shaping of thermoplastic molding compositions F exhibit reduced deposit formation on the shaping mold and/or on the surface of the moldings.

The invention claimed is:

1. A process for the production of moldings via shaping of thermoplastic molding compositions F with reduced formation of deposit on the shaping mold, wherein the thermoplastic molding compositions F comprise an amount of from 3 mg/kg to 75 mg/kg (calculated as the total of the mg of Mg and the mg of Ca per kg of thermoplastic molding composition F and determined by means of atomic emission spectrometry using inductively coupled plasma (ICPAES)) of at least one magnesium compound and/or calcium compound, wherein the molding compositions F comprise, alongside the at least one magnesium compound and/or calcium compound, A) from 20 to 100% by weight of at least one impact-modified vinylaromatic copolymer selected from the group consisting of acrylonitrile-butadiene-styrene copolymers (ABS), acrylonitrile-styrene-acrylate copolymers (ASA), and methacrylate-acrylonitrile-butadiene-styrene copolymers (MABS),
   B) from 0 to 80% by weight of at least one polycarbonate (PC), and
   C) from 0 to 60% by weight of further additives conventional in plastics, where each of the percentages by weight is based on the total weight of components A) to C) and the total of the percentages by weight is 100% by weight.

2. The process according to claim 1, wherein the shaping takes place via extrusion to give pellets, foils, sheets, strands, or profiles.

3. The process according to claim 1, wherein the shaping takes place via injection-molding to give moldings.

4. A molding that can be produced by the process according to claim 1.

5. A thermoplastic molding composition F for the production of moldings by the process according to claim 1, comprising an amount of from 3 mg/kg to 75 mg/kg (calculated as the total of the mg of Mg and the mg of Ca per kg of thermoplastic molding composition F and determined by means of atomic emission spectrometry using inductively coupled plasma (ICPAES)) of at least one magnesium compound and/or calcium compound.

6. The process according to claim 2, wherein the shaping takes place via injection-molding to give moldings.

7. A molding that can be produced by the process according to claim 1.

8. A molding that can be produced by the process according to claim 2.

9. A molding that can be produced by the process according to claim 3.

10. A thermoplastic molding composition F for the production of moldings by the process according to claim 2, comprising an amount of from 3 mg/kg to 75 mg/kg (calculated as the total of the mg of Mg and the mg of Ca per kg of thermoplastic molding composition F and determined by means of atomic emission spectrometry using inductively coupled plasma (ICPAES)) of at least one magnesium compound and/or calcium compound.

11. A thermoplastic molding composition F for the production of moldings by the process according to claim 3, comprising an amount of from 3 mg/kg to 75 mg/kg (calculated as the total of the mg of Mg and the mg of Ca per kg of thermoplastic molding composition F and determined by means of atomic emission spectrometry using inductively coupled plasma (ICPAES)) of at least one magnesium compound and/or calcium compound.

12. The process according to claim 2, wherein the shaping takes place via injection-molding to give moldings.

13. A molding that can be produced by the process according to claim 2.

14. A molding that can be produced by the process according to claim 3.

\* \* \* \* \*